No. 659,578. Patented Oct. 9, 1900.
R. U. CHADWICK.
COMBINED VACUUM AND DISCHARGE VALVE.
(Application filed June 1, 1900.)
(No Model.)
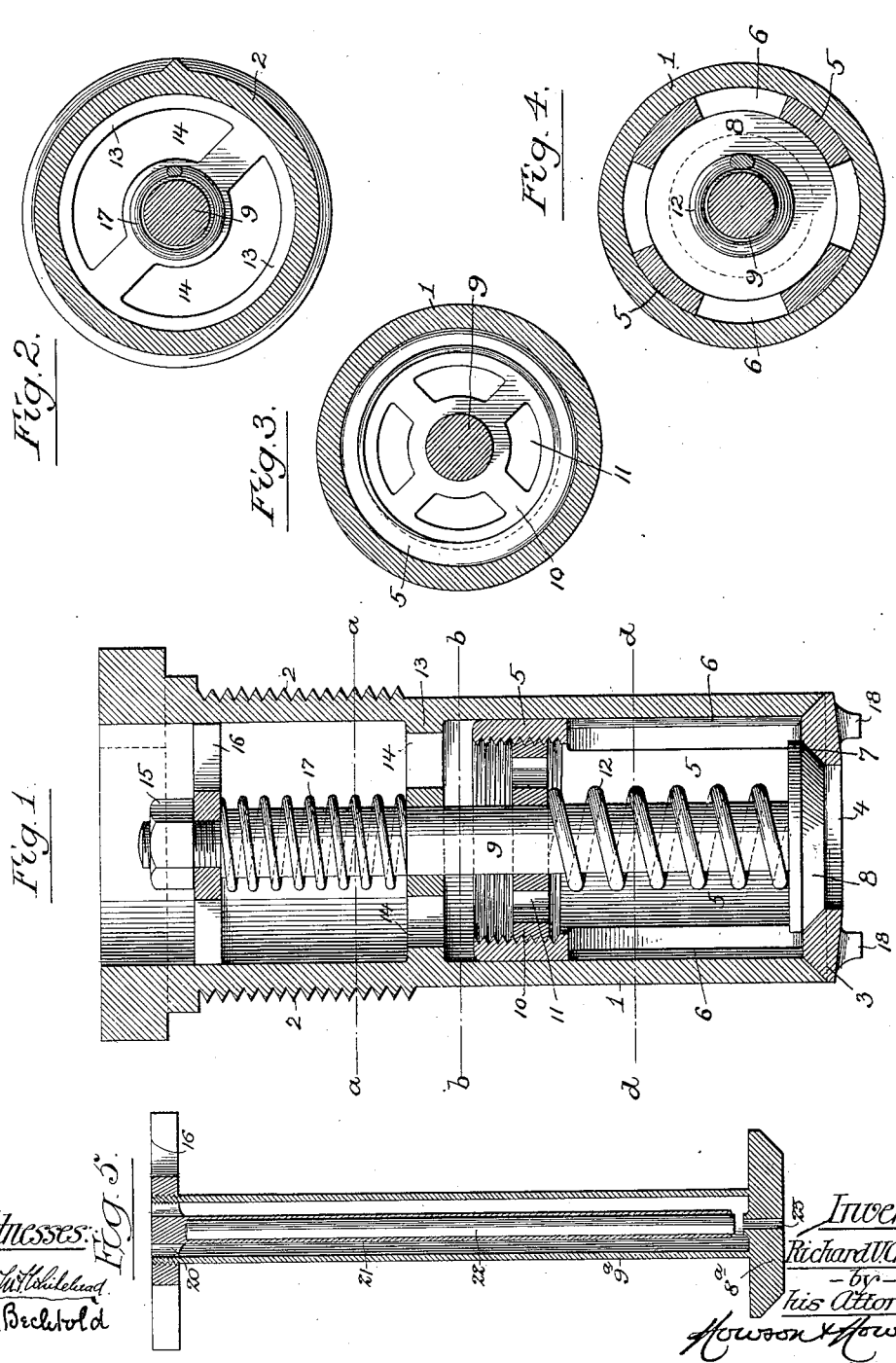

UNITED STATES PATENT OFFICE.

RICHARD U. CHADWICK, OF PHILADELPHIA, PENNSYLVANIA.

COMBINED VACUUM AND DISCHARGE VALVE.

SPECIFICATION forming part of Letters Patent No. 659,578, dated October 9, 1900.

Application filed June 1, 1900. Serial No. 18,777. (No model.)

*To all whom it may concern:*

Be it known that I, RICHARD U. CHADWICK, a citizen of the United States, residing in Philadelphia, Pennsylvania, have invented certain Improvements in a Combined Vacuum and Discharge Valve, of which the following is a specification.

The object of my invention is to provide a combined vacuum and discharge valve intended mainly for application to the steam-heated cylinder of a drying-machine for the purpose of preventing, on the one hand, the formation of a partial vacuum in said cylinder, and on the other hand the maintenance of any pressure therein in excess of a predetermined limit, the valve being of simple construction and having but few parts, which can be readily assembled or taken apart. The valve, moreover, is contained almost entirely within the cylinder and is designed to provide free inflow of air in large volume when the conditions within the cylinder are such as to require said inflow and to permit free escape of steam when the predetermined pressure is exceeded. A special form of the valve also acts as an automatic air-escape valve for the cylinder.

In the accompanying drawings, Figure 1 is a longitudinal sectional view of a combined vacuum and discharge valve made in accordance with my invention. Fig. 2 is a transverse section on the line $a\,a$, Fig. 1. Fig. 3 is a transverse section on the line $b\,b$, Fig. 1. Fig. 4 is a transverse section on the line $d\,d$, Fig. 1; and Fig. 5 is a longitudinal section of the special form of valve with automatic air-escape.

The main casing or chest of the valve is represented at 1, this casing being threaded externally at 2 for being screwed into the threaded opening formed in the shell of the cylinder and the outer end of the said casing being preferably of square or other polygonal form for the application of a wrench or other tool whereby its manipulation is effected. The inner end of the casing 1 is beveled or otherwise shaped, so as to form a seat for a valve 3, which has a central opening 4 and an inwardly-projecting tubular body 5, fitting snugly within the casing 1, but having slots 6 formed therein, whereby a free flow of air inwardly through the valve-casing is permitted when the valve 3 has been drawn away from its seat.

Surrounding the opening 4 in the valve 3 is a seat 7 for the reception of another valve 8, opening outwardly, this valve having a stem 9 passing through the hub of a threaded ring 10, which is screwed into a threaded opening in the outer end of the tubular body 5 of the valve 3, said ring having openings 11, through which steam or other fluid can freely pass. Between the valve 8 and the hub of the ring 10 is interposed a coiled spring 12, which surrounds the stem 9, the tension of this spring being determined by the extent to which the threaded ring 10 is screwed into the threaded end of the tubular body 5 of the valve 3. Lugs 18 on the valve 3 provide a means of holding the latter, so as to prevent its rotation while the ring 10 is being screwed into or unscrewed from the hollow body of the valve.

The valve-stem 9 passes through a transverse partition 13 in the chest or casing 1, which partition has openings 14, providing for the free flow of fluid past the same, and the outer end of said stem 9 has secured to it by means of a nut 15 a cross-bar or spider 16, free to move in the chest or casing 1 and serving as a bearing for the outer end of a coiled spring 17, which surrounds the stem 9 and has its inner bearing against the partition 13. Hence said spring 17 serves to press the valve 3 outwardly against its seat at the inner end of the casing 1, while the coiled spring 12 serves to press the valve 8 inwardly against its seat on the valve 3. A single stem thus serves for both valves.

When by reason of condensation of steam in the cylinder or from other causes a partial vacuum is formed in the latter to such a degree that the pressure of the air exerted upon an area equal to that of the valve 3 is in excess of the tension of the spring 17, the valve 3 will be at once moved inward, so as to permit of a free flow of air into the cylinder, thereby preventing the production in the latter of such a degree of vacuum as would tend to cause collapse of the cylinder by reason of the external pressure of the air thereupon.

During such movement the valve 8 is held to its seat by the pressure of the spring 12, said valve and spring both moving with the valve 3. When there is neither vacuum nor excessive pressure within the cylinder, both valves 3 and 8 will be held to their seats by the pressure of their respective springs, any pressure within the cylinder aiding the spring 17 in the performance of its duty; but when this pressure exceeds a limit predetermined by the tension imparted to the spring 12 said spring will yield, so as to permit the valve 8 to open, the steam or other fluid escaping around said valve and through the openings in the ring 10 and partition 13, thereby preventing explosion.

It will be noted that the chest or casing 1 is open at both ends and has a straight bore, so that the flow of fluid in either direction through the same is not obstructed, as it would be in the case of an angular passage.

The valve structure has but four parts, which can be readily assembled and then held in place by the single nut 15, and said parts can be as readily taken apart on the removal of the nut.

I am aware that combined vacuum and discharge valves have been known for many years, and I do not, therefore, broadly claim such construction, the main features of novelty in my combined valve being its simplicity of construction and its adaptability for use in connection with the steam-heated cylinders of drying-machines, the fact that the vacuum-valve is the valve of largest area and contains the discharge-valve rendering it especially available for such use, because of the large area of inlet for the air thereby afforded in order to effect instant change in the conditions within the cylinder, which might otherwise lead to collapse of the same from external pressure.

The cylinder will usually be provided with two or more of my improved valves, and the combined area of the relief-valves 8 equals or exceeds the area of the steam-inlet pipe, so that free escape is provided whenever the predetermined pressure is exceeded.

The valve 8$^a$ shown in Fig. 5 has a hollow stem 9$^a$, open at the outer end and threaded externally for the reception of the guide-bar 16 and internally for the reception of the threaded wings 20 upon the outer end of a tubular casing 21, which contains a rod or bar 22, of material which is more susceptible to changes of temperature than the metal of the valves and the casing 1, and hence expands and contracts more readily and to a greater extent than said valves and casing. The inner end of the rod or bar acts as a valve to open and close an opening 23, formed in the valve 8. When there is no steam in the cylinder, the rod 22 is contracted and the opening 23 is open, so that when steam is admitted to the cylinder the air can be freely expelled therefrom through the hollow stem of the valve 8; but as soon as the steam acts upon the rod 22 the same is expanded, the opening 23 is closed, and the escape of steam is prevented. The casing 21 serves as a guide and shield for the expansion-rod 22 and prevents buckling of the same under compressive strain.

Having thus described my invention, I claim and desire to secure by Letters Patent—

1. The combination, in a combined vacuum and discharge valve, of a chest or casing, a vacuum-valve adapted to a seat thereon, a discharge-valve adapted to a seat on the outside of said vacuum-valve, and yielding means for maintaining said valves against their seats, the means for holding the relief-valve to its seat being disposed on the outside of the vacuum-valve and carried by and moving with the same, substantially as specified.

2. The combination, in a combined vacuum and discharge valve, of a chest or casing, a vacuum-valve adapted to a seat thereon, a discharge-valve adapted to a seat on the outside of said vacuum-valve, a bearing-ring carried by the outer portion of the vacuum-valve and adjustable longitudinally in respect thereto, a spring interposed between said bearing-ring and the pressure-valve, and yielding means for holding the vacuum-valve against its seat, substantially as specified.

3. The combination, in a combined vacuum and discharge valve, of a chest or casing, a partition therein, a vacuum-valve adapted to a seat on said chest, a pressure-valve adapted to a seat on said vacuum-valve, a bearing-ring carried by the vacuum-valve and adjustable longitudinally in respect to the same, a spring interposed between said bearing-ring and the pressure-valve, a pressure-valve stem passing through said ring and through the partition in the chest or casing, a guide-bar carried by said stem, and a spring interposed between said guide-bar and the partition in the chest or casing, substantially as specified.

4. The combination in a combined vacuum and discharge valve of a chest or casing, a vacuum-valve adapted to a seat thereon, a discharge-valve adapted to a seat on said vacuum-valve, springs for holding the valves against their seats, and a single stem serving for both valves, substantially as specified.

5. The combination, in a combined vacuum and discharge valve, of a chest or casing having a straight longitudinal bore open at both ends for the direct passage of fluid through it, a vacuum-valve adapted to a seat on said chest, a discharge-valve adapted to a seat on said vacuum-valve, and yielding means for maintaining said valves against their seats, substantially as specified.

6. The combination, in a combined vacuum, relief, and automatic air-discharge valve, of the chest or casing, a valve seated thereon, a second valve seated on the first and having an opening through it and also a hollow stem, and an automatic expansion-valve contained in said hollow stem, and serving, when expanded, to close said opening, substantially as specified.

In testimony whereof I have signed my name to this specification in the presence of two subscribing witnesses.

RICHARD U. CHADWICK.

Witnesses:
FRANK E. BECHTOLD,
JOS. H. KLEIN.